(12) United States Patent
Shelander et al.

(10) Patent No.: US 12,042,751 B2
(45) Date of Patent: Jul. 23, 2024

(54) HEAT PUMP DRIVEN DISTILLATION

(71) Applicants: Agustus Berman Shelander, Los Angeles, CA (US); Robert P. Genovese, Riverside, CA (US)

(72) Inventors: Agustus Berman Shelander, Los Angeles, CA (US); Robert P. Genovese, Riverside, CA (US)

(73) Assignee: ACE MACHINE DESIGN, INC., Commerce, CA (US)

( * ) Notice: Subject to any disclaimer, the term of this patent is extended or adjusted under 35 U.S.C. 154(b) by 0 days.

(21) Appl. No.: 17/899,655

(22) Filed: Aug. 31, 2022

(65) Prior Publication Data

US 2023/0060952 A1    Mar. 2, 2023

Related U.S. Application Data

(60) Provisional application No. 63/238,824, filed on Aug. 31, 2021.

(51) Int. Cl.
*B01D 3/00*    (2006.01)
*B01D 5/00*    (2006.01)
*F25B 31/00*    (2006.01)

(52) U.S. Cl.
CPC ........... *B01D 3/007* (2013.01); *B01D 5/0015* (2013.01); *B01D 5/0021* (2013.01);
(Continued)

(58) Field of Classification Search
CPC .... B01D 3/007; B01D 5/0015; B01D 5/0021; B01D 5/0039; B01D 5/006; B01D 5/0084; F25B 31/002
See application file for complete search history.

(56) References Cited

U.S. PATENT DOCUMENTS 1,116,804 A    11/1914   Daley
1,331,600 A    2/1920   Wales
(Continued)

OTHER PUBLICATIONS

Bruinsma et al., "Heat Pumps In Distillation," paper presented at the Distillation & Absorption Conference, Sep. 12-15, 2010, Eindhoven, Netherlands [available as Energy Research Centre of the Netherlands (ECN) document ECN-M--10-090].
(Continued)

*Primary Examiner* — Jonathan Miller
(74) *Attorney, Agent, or Firm* — Intellectual Property Venture Group; Raymond E. Roberts (57) ABSTRACT

A distillation system receives a feed solution to produce residue and distillate. A heat pump includes parts of a first and second heat exchangers, a working fluid, a working fluid compressor, and an expansion device. The working fluid receives available heat energy from the distillate in the second heat exchanger, receives at least some additional heat energy in the working fluid compressor, and releases at least some of that heat energy into the feed solution in the first heat exchanger. The first heat exchanger receives the feed solution, permitting transfer of at least some heat energy into it. A separator receives the feed solution from the first heat exchanger and separates it into the residue and distillate. The second heat exchanger receives the distillate, permitting transfer of at least some heat energy back into the working fluid. And a distillate extractor directs the distillate out of the second heat exchanger.

18 Claims, 13 Drawing Sheets

(52) U.S. Cl.
CPC .......... *B01D 5/0039* (2013.01); *B01D 5/006* (2013.01); *B01D 5/0084* (2013.01); *F25B 31/002* (2013.01)

(56) References Cited

U.S. PATENT DOCUMENTS

| | | | |
|---|---|---|---|
| 2,777,514 A | | 1/1957 | Eckstrom |
| 3,070,463 A | | 12/1962 | Barday |
| 3,483,092 A | | 12/1969 | Young |
| 4,003,798 A | | 1/1977 | McCord |
| 4,142,379 A | | 3/1979 | Kuklinski |
| 4,293,323 A | | 10/1981 | Cohen |
| 4,349,416 A | | 9/1982 | Brandt et al. |
| 4,390,396 A | * | 6/1983 | Koblenzer ............. B01D 3/001 202/170 |
| 4,402,795 A | | 9/1983 | Erickson |
| 4,615,769 A | * | 10/1986 | Horigome ................. C07C 7/04 585/800 |
| 4,626,321 A | * | 12/1986 | Grethlein ............... B01D 3/007 203/DIG. 19 |
| 4,645,569 A | | 2/1987 | Akabane et al. |
| 4,695,349 A | * | 9/1987 | Becker .................. B01D 3/007 159/24.3 |
| 4,830,711 A | | 5/1989 | Delbourgo et al. |
| 4,907,738 A | * | 3/1990 | Harris ..................... F25B 30/06 62/323.1 |
| 5,124,004 A | * | 6/1992 | Grethlein ............. B01D 1/2856 203/50 |
| 5,169,502 A | | 12/1992 | Mugele |
| 5,227,027 A | * | 7/1993 | Topper .................. F25B 29/003 203/40 |
| 5,294,303 A | * | 3/1994 | Robbins ................ B01D 3/007 202/205 |
| 5,943,879 A | * | 8/1999 | Sada ..................... F24F 5/0003 62/119 |
| 6,010,599 A | * | 1/2000 | Wang .................... B01D 3/007 202/205 |
| 7,378,536 B2 | | 5/2008 | Goebbel et al. |
| 8,048,304 B2 | * | 11/2011 | Waibel ............... B01D 11/0296 165/4 |
| 8,283,509 B2 | | 10/2012 | Sechrist et al. |
| 8,323,457 B2 | * | 12/2012 | Townsend .............. F25J 3/0238 202/153 |
| 10,836,651 B2 | * | 11/2020 | Dussault .............. B01D 5/0039 |
| 2008/0302650 A1 | | 12/2008 | Bello |
| 2009/0166175 A1 | * | 7/2009 | Waibel ................. B01D 11/028 202/185.1 |
| 2010/0108487 A1 | * | 5/2010 | Townsend .............. B01D 3/007 203/26 |
| 2013/0168225 A1 | * | 7/2013 | Oikimus ................. C02F 1/041 202/180 |
| 2014/0299460 A1 | * | 10/2014 | Al-Maaitah ............... C02F 1/14 202/185.1 |
| 2016/0251235 A1 | | 9/2016 | Shahsavar et al. |
| 2017/0349451 A1 | * | 12/2017 | Lockwood ............ B01D 3/007 |
| 2023/0060952 A1 | * | 3/2023 | Shelander ............ B01D 5/0015 |

OTHER PUBLICATIONS

Marina et al., "A Bottom-Up Approach for Determining the European Heat Pump Potential," paper by presented at the SusTEM Conference, Jul. 2017, Netherlands [available as ECN document ECN-M--17-021].

Bojnowski et al., "Low Energy Separation Processes," journal, Chemical Engineering Progress, May 7, 1979, p. 67-71, vol. 76 No. 7, US.

Rush, F.E., "Energy Saving Alternatives to Distillation," journal, Chemical Engineering Progress, Jul. 1980, p. 44-49, vol. 76 No. 7, US.

Stephenson et al., "Energy Conservation in Distillation," journal, Chemical Engineering Progress, Aug. 1980, p. 68-71, vol. 76 No. 8, US.

\* cited by examiner

HEAT PUMP DRIVEN DISTILLATION

CROSS-REFERENCE TO RELATED APPLICATIONS

This application claims the benefit of U.S. Provisional Application No. 63/238,824, filed 31 Aug. 2021, hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Technical Field

The present invention relates generally to separatory distillation processes and apparatus, and, more specifically, to recovering heat by indirect heat exchange by utilizing recovered heat for heating the distillation zone.

Background Art

Distillation is the process of separating the components or substances from a liquid mixture by using selective boiling and condensation. Widespread examples of uses of distillation include purification of alcohol, desalination, crude oil refining, and making liquefied gases from air. Humans are believed to have been using distillation since at least 3000 BC in the Indus valley.

The boiling of a mixture in distillation requires the input of heat energy to separate out a vapor, and the later condensation then requires removal the heat energy from the vapor. In modern distillation, boiling has historically utilized heating units which are electrically energized, or which receive heat energy from some external source. Similarly, condensation has historically utilized cooling units, such as a conventional refrigeration unit, which are also driven by electrical energy, or which otherwise releases heat into the surroundings. With increasing energy costs and ecological concern, such historical boiling and condensing approaches are increasingly disadvantageous.

One device that can perform both heat energy input and removal is the heat pump. There are two basic ways a heat pump system can be to integrates into a distillation system. One is a vapor recompression system (VRC), which is not relevant here and not further discussed. The other is a vapor compression system (VC), where a working fluid (typically called a refrigerant) is independent from the mixture being separated.

Detailed discussion of the current general state of heat pumps can be found in "Heat Pumps In Distillation" by Bruinsma & Spoelstra, a paper presented at the Distillation & Absorption Conference, 12-15 Sep. 2010, Eindhoven, Netherlands [available as Energy Research Centre of the Netherlands (ECN) document ECN-M—10-090] and "A Bottom-Up Approach for Determining the European Heat Pump Potential" by Marina et al. presented at the SusTEM Conference, July 2017 [available as ECN document ECN-M—17-021].

From the relative recent publication dates of these papers, 2010 and 2017 in a field of application that dates from 3000 BC, it can be appreciated that heat pump technology, and the applications thereof are, still evolving and that there still is much potential for improvement.

BRIEF SUMMARY OF THE INVENTION

Accordingly, it is an object of the present invention to provide an improved driven distillation system.

Briefly, one preferred embodiment of the present invention is a distillation system having a process side and an energy recovery side. The process side receives a feed solution including a solute, to produce therefrom a residue and a distillate. A heat pump in the energy recovery side of the distillation system includes parts of a first heat exchanger and a second heat exchanger. The first heat exchanger has a first exchanger process side in the process side, and a first exchanger recovery side in the energy recovery side. The second heat exchanger has a second exchanger process side in the process side, and a second exchanger recovery side in the energy recovery side. The heat pump further includes a working fluid compressor, an expansion device, and a working fluid. The heat pump passes the working fluid through the second exchanger recovery side, through the working fluid compressor, through the first exchanger recovery side, through the expansion device, and back into the second exchanger recovery side such that the working fluid receives available heat energy from the distillate while in the second heat exchanger, receives at least some additional heat energy while in the working fluid compressor, and releases at least some heat energy into the feed solution in the first heat exchanger. The first exchanger process side receives the feed solution, thereby permitting transfer of at least some the heat energy into it. A separator receives the feed solution from the first heat exchanger and separate the feed solution into the residue and the distillate. The second exchanger process side receives the distillate, thereby permitting transfer of at least some heat energy back into the working fluid. And a distillate extractor directs the distillate out of the second heat exchanger.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which:

FIG. 3a-b show respective portions (sides) of the overall distillation system in FIGS. 1-2, wherein

In the various figures of the drawings, like references are used to denote like or similar elements or steps.

DETAILED DESCRIPTION OF THE INVENTION

A preferred embodiment of the present invention is a system for heat pump driven distillation. As illustrated in the various drawings herein, and particularly in the view of FIGS. 1-2, an embodiment of the invention is depicted by the general reference character 10.

Figure 1:
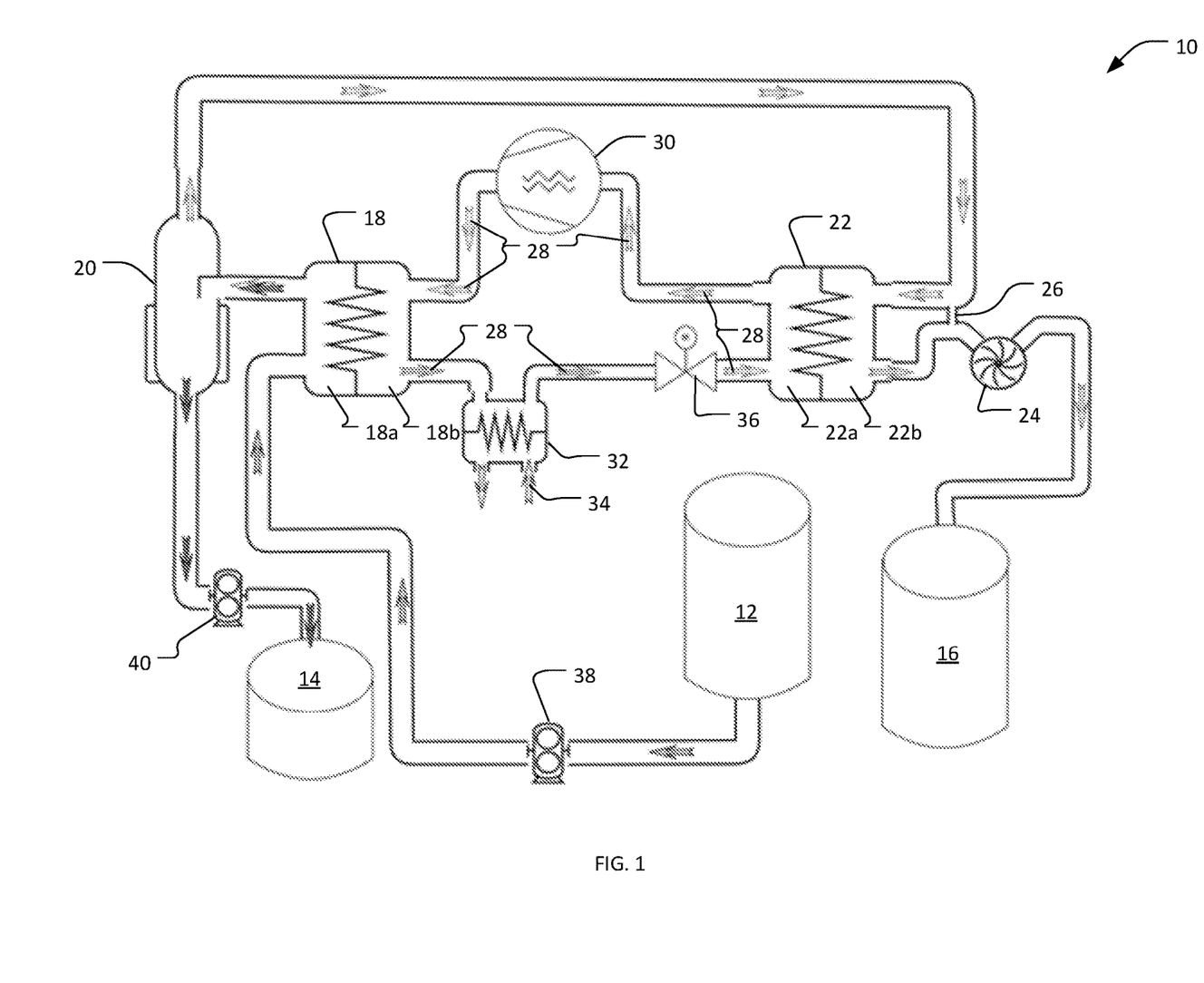
FIG. 1 is a schematic diagram depicting a heat pump driven distillation system in accord with the present invention.

FIG. 1 is a schematic diagram depicting a heat pump driven distillation system 10 in accord with the present invention. The distillation system 10 has a process side 10a (FIG. 3a) and an energy recovery side 10b (FIG. 3b). The process side 10a receives a feed solution 12, that is, a liquid solution including one or more solutes, and these solutes ultimately exit the distillation system 10 as a residue 14 and as a distillate 16. Either or both of the residue 14 and the distillate 16 may be principal, desired products of the inventive distillation system 10. The energy recovery side 10b of the distillation system 10 is a heat pump 42 (FIG. 3b), described in detail presently.

The distillation system 10 passes the feed solution 12 to a first heat exchanger 18, where it is heated and the solvent liquid (e.g., ethanol) vaporizes, becoming instead a solvent vapor bearing the solutes. Collectively this all is passed into a separator 20.

In the separator 20 at least one of the solutes is separated out, collected, and exits the distillation system 10 as the residue 14. For reference herein the solutes that end up in the residue 14 are termed the "residue born solutes." Concurrently, the solvent vapor and the other solute(s) are also separated out and passed onward to a second heat exchanger 22.

In the second heat exchanger 22 the solvent vapor and the solutes therein are cooled, with the solvent vapor again becoming a solvent liquid bearing one or more solutes. This is passed into a distillate extractor 24 (here shown as a liquid ring compressor) to ultimately exit the distillation system 10 as the distillate 16. [For reference herein the solutes that end up in the distillate 16 are termed the "distillate born solutes."] Any solvent vapor (and therein contained solutes) that is not yet condensed into a liquid form after the second heat exchanger 22 can pass through an optional bypass port 26 before the distillate extractor 24, to reenter the second heat exchanger 22.

The distillation system 10 further includes a working fluid 28 and a working fluid compressor 30 (e.g., a scroll compressor) to compresses the a working fluid 28, thus heating it before it enters the first heat exchanger 18 where the feed solution 12 is then therewith heated. As heat energy is exchanged from the working fluid 28 into the feed solution 12 it cools and condenses under pressure before it exits the first heat exchanger 18. The working fluid 28 is then passed through an optional third heat exchanger 32, where it is further cooled (e.g., with a flow of water 34), as shown, before passing through an expansion device 36 (e.g., an expansion valve, as shown, or a capillary or any other suitable expansion mechanism as used in the distillation arts) where the working fluid 28 evaporates and becomes yet colder before entering the second heat exchanger 22. In the second heat exchanger 22 the working fluid 28 absorbs heat energy from the distillate born solutes, permitting the solvent vapor to condense back to liquid form. The working fluid 28 can be reused in this manner ad infinitum.

The working fluid 28 used here is typically a "refrigerant" that may be under relative pressure or vacuum with respect to atmospheric pressure outside the process. It is chosen and controlled to make the temperatures of evaporation and condensation optimal for use in a commonly available refrigeration/HVAC compressor (e.g., −20 degrees Celsius to 60 degrees Celsius).

The third heat exchanger 32 can remove excess heat generated by the working fluid compressor 30. This removes heat from the working fluid 28 after most of the heat has been given up to evaporation in the first heat exchanger 18 yet before it flows through the expansion device 36 and into the second heat exchanger 22.

Digressing briefly, the feed solution 12 may include all of the solutes dissolved in ethanol, another solvent, or a mixture of solvents. FIG. 1 includes an optional feed pump 38 to help introduce the feed solution 12 into the overall process and an optional residue pump 40 to help remove the residue 14 from the overall process. When present, these may be rotary compressor type pumps, as shown, or any suitable equivalent as known in the art. These are optional because other mechanisms of directing materials may be used, such as gravity feed rather than the pumps/compressors shown in FIG. 1.

Figure 2:
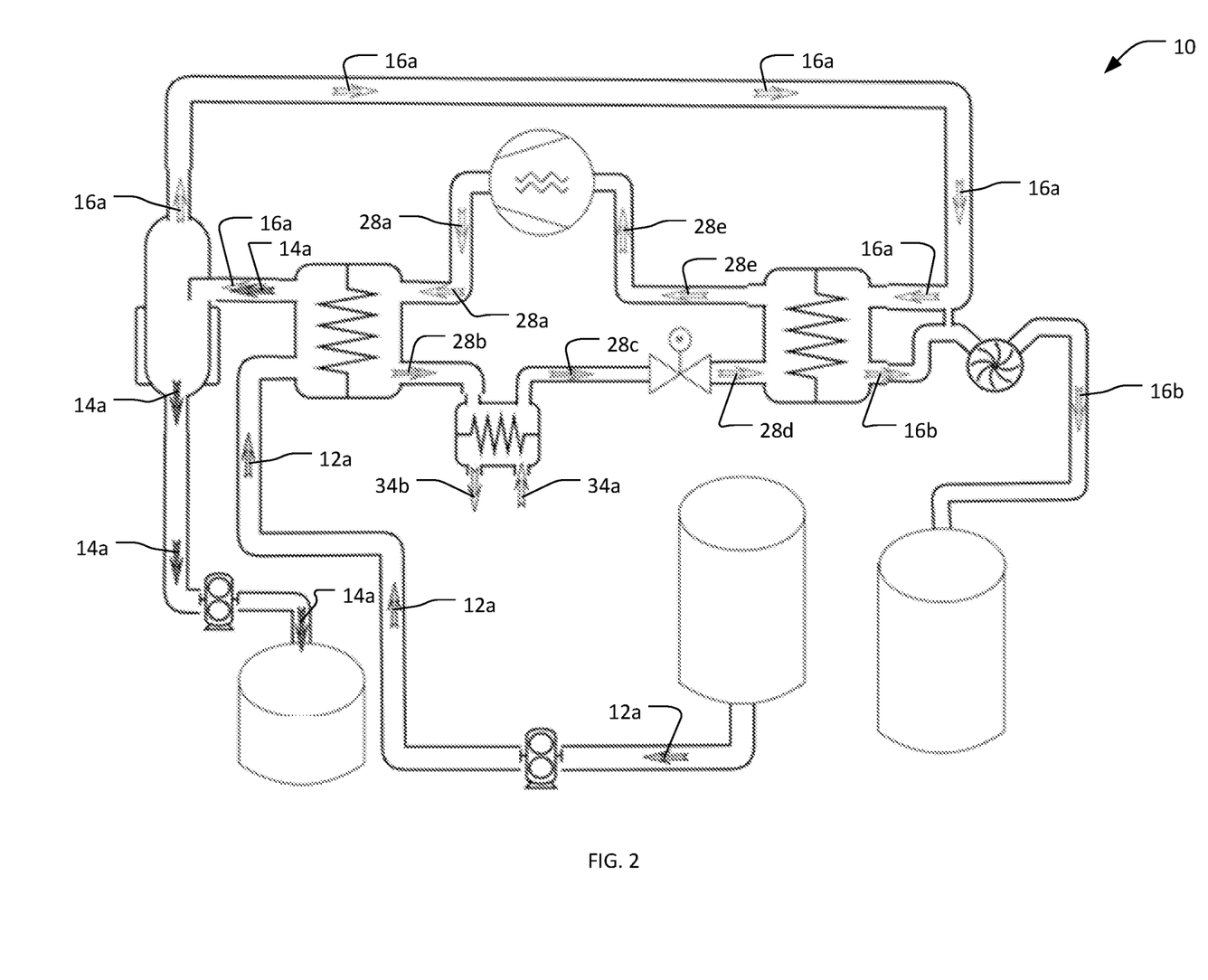
FIG. 2 is a version of FIG. 1 that is simplified by removing apparatus references to facilitate seeing liquid and vapor states depicted as arrows.

FIG. 2 is a version of FIG. 1 that is simplified by removing apparatus references to facilitate seeing liquid and vapor states depicted with arrows. The feed solution 12 (liquid) is depicted by arrows 12a; the residue 14 (liquid containing the residue born solutes) is depicted by arrows 14a; hot solvent vapor containing the distillate 16 (liquid containing the distillate born solutes) is depicted by arrows 16a; and cool solvent vapor containing the distillate 16 is depicted by arrows 16b.

The working fluid 28 is depicted here by arrows 28a-e. At arrow 28a the working fluid 28 is a vapor under high pressure and is bearing heat energy. At arrow 28b the working fluid 28 is a vapor still under high pressure that has given up at least some of its heat energy to the feed solution 12. At arrow 28c the working fluid 28 is still a vapor under high pressure but one that has optionally given up excess heat while flowing through the optional third heat exchanger 32. [The flow of water 34 through the third heat exchanger 32 is depicted by arrows 34a-b.] At arrow 28d the working fluid 28 is a vapor now under low pressure after having passed through the expansion device 36. And at arrow 28e the working fluid 28 is still a vapor under low pressure, albeit one that has now potentially drawn in heat from the distillate 16.

In discussing the inventive heat pump driven distillation system 10 it can help to think in terms of the overall systems as well as individual components having, sharing, or being on respective sides. The following discussion is presented to clarify this.

Figure 3A:
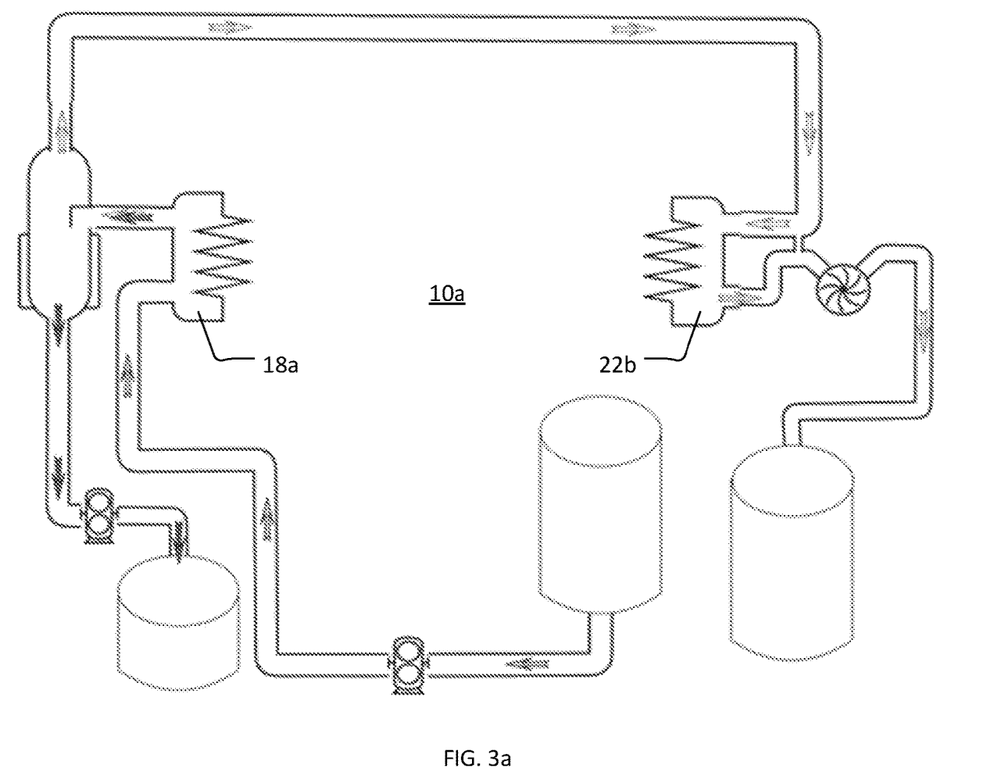
FIG. 3a shows just a process side and FIG. 3b shows just an energy recovery side (i.e., a heat pump)
Figure 3B:
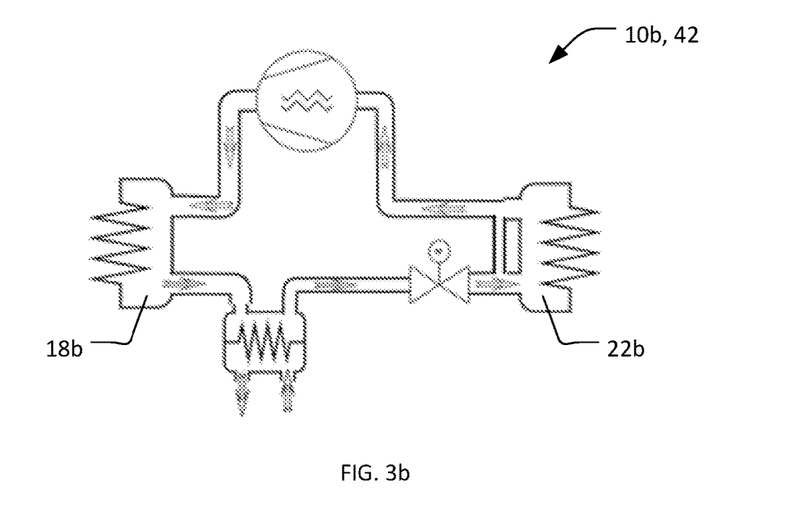

FIG. 3a-b show respective "sides" of the overall distillation system 10 in FIGS. 1-2, wherein FIG. 3a shows just the process side 10a and FIG. 3b shows just the energy recovery side 10b (i.e., the heat pump 42). The process side 10a is where the distillation process per se takes place, where the feed solution 12 is received into the process, and where the residue 14 and the distillate 16 are separated, collected, and exit from the process. The energy recovery side 10b (the heat pump 42) is where energy used by the distillation system 10 is input, transferred, and recovered from the working fluid 28.

Continuing with the theme of sides, the first heat exchanger 18 has a first exchanger process side 18a and a first exchanger recovery side 18b, and the second heat exchanger 22 has a second exchanger recovery side 22a and a second exchanger process side 22b.

The first exchanger process side 18a is a cool side and the first exchanger recovery side 18b is a hot side. The first exchanger process side 18a may also be a termed an "evaporation side" because this is where the feed solution 12 evaporates as it absorbs heat energy from the hotter first exchanger recovery side 18b.

The second exchanger recovery side 22a is a cool side and the second exchanger process side 22b is a hot side. The second exchanger process side 22b may also a termed a "condensation side" because this is where the distillate 16 condenses as it releases heat energy into the cooler second exchanger recovery side 22a.

The first exchanger recovery side 18b is also a high pressure side (arrows 28a-c) and the second exchanger recovery side 22a is also a low pressure side (arrows 28d-e). The working fluid compressor 30 and the expansion device 36 separate the low pressure side (right) and the high pressure side (left). It should be noted, however, "pressure" in a heap pump context is merely relative. What is generally referred to as "pressure" here can mean a pressure above atmospheric pressure outside the distillation system 10 or a pressure below atmospheric pressure outside the distillation system 10 (i.e., a relative vacuum). A low pressure, arrows 28d-e here, is lower than a high pressure, arrows 28a-c, but may be so by only a few milli bar.

Summarizing, a heat pump (primarily) collects heat from the condensation side of a distillation process and that heat is (primarily) employed by the evaporation side of the same distillation process. Here the manner of operation of the first heat exchanger 18 and the second heat exchanger 22 particularly contribute to the efficiency of the inventive distillation system 10. The distillation system 10 can be optimized process to minimize the heat lift of the pump and no additional heating or "makeup heat" need be added.

In some embodiments of the inventive distillation system 10 the inventors prefer to use parallel plate type heat exchangers for the first heat exchanger 18 and the second heat exchanger 22. When this is the case for the first heat exchanger 18, process-side evaporation can flow upward (important because it evenly distributes the liquid) while the working fluid 28 simultaneously flows downward and condenses. In this manner, the first heat exchanger 18 is used both as a process-side evaporator and a recovery-side condenser. Similarly, when this is the case for the second heat exchanger 22, process-side condensation can easily be directed (as shown) to flow downward in the second heat exchanger 22 while the working fluid 28 (i.e., the "refrigerant") is directed to flow upward and evaporate. In this manner, the second heat exchanger 22 is used both as a process-side condenser and a recovery-side working fluid evaporator.

Another advantage of the inventive distillation system 10 is that it may employ different apparatus as the separator 20. For example, once the process fluid (the distillate 16) is at least partially vaporized in the process evaporator (the first heat exchanger 18) it's liquid and vapor components can be separated with a simple heated-jacket type, as shown in FIGS. 1-6, or with a vortex type separator or a packed type column separator. A heated jacket on the separator 20 is optional but can be used where additional heat (makeup heat) is added. Such a jacket can be implemented on a gravity, vortex, or packed column type separator.

A gravity type separator is a large volume where heavier components of a fluid stream (in the present case liquid droplets in vapor) can fall to the bottom and be separated out by gravity.

A vortex type separator can be smaller and achieve better separation (collecting smaller droplets that may stay suspended in a gravity separator) but has a pressure drop which will increase the overall energy required to run the distillation system 10.

A packed column type separator is similar to a gravity separator but filled with "packing" material, which may be structured or random, but which has a large amount of surface area and allows vapor to flow upward and liquid to flow downward. The large surface area allows for a lot of interaction between liquid and vapor so that any entrained droplets are filtered out and additional evaporation and condensation steps can occur, enabling multiple "theoretical plates" of distillation to occur in one system. [One theoretical plate is the separation of components that can be achieved in one "simple" distillation (e.g., two plates would be like distilling the distillate)].

Bubble plates are also a common type of distillation column with similar results as column packing (and the origin of the term "plate" in theoretical plates). However, these are larger and cause more pressure drop than in packing, so they are generally regarded as less desirable.

Figure 4:
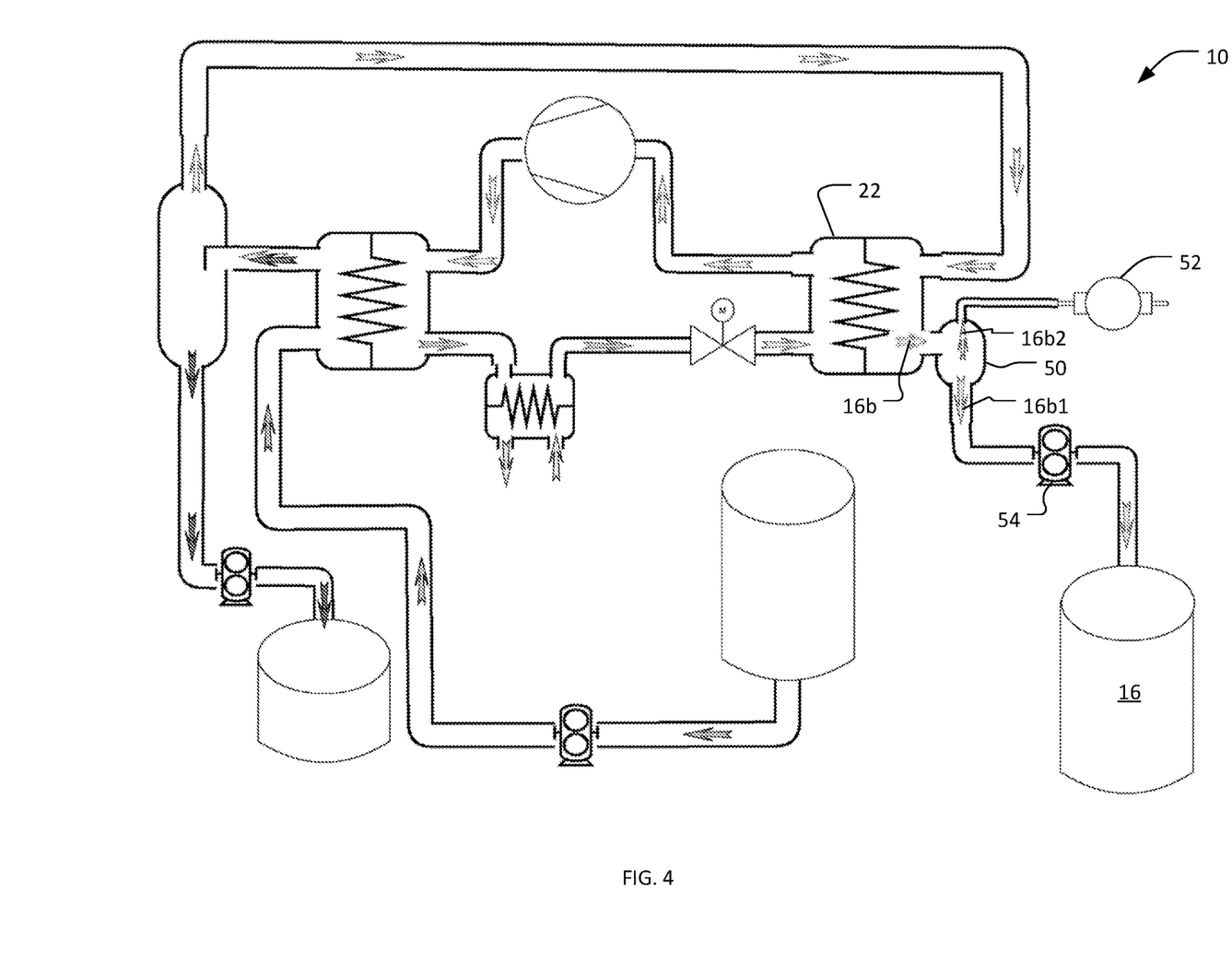
FIG. 4 is a schematic diagram depicting an alternate distillation system in accord with the present invention.

FIG. 4 is a schematic diagram depicting an alternate distillation system 10 in accord with the present invention. Here the optional bypass port 26 in FIG. 1 is omitted and the distillate extractor 24 in FIG. 1 is replaced with a second separator 50 (here a vacuum separator), a vacuum pump 52, and a distillate pump 54 (when present, this may also be a rotary compressor type pump, as shown, or any suitable equivalent as known in the art). As the distillate 16 (liquid containing the distillate born solutes), depicted by arrow 16b, enters the second separator 50 it separates into the distillate born solutes (arrow 16b1) and the solution that contained the distillate (arrow 16b2). The distillate born solutes (arrow 16b1) are directed out of the process by the distillate pump 54 (as shown) and the solution that contained the distillate (arrow 16b2) are drawn off by the vacuum pump 52.

In FIG. 4 the second separator 50 is depicted as a vacuum type, specifically a small gravity separator where the liquid distillate is separated from non-condensable gases (such as air that may have leaked into the distillation system 10 or that has dissolved in the feed solution 12). A liquid pump (such as a gear pump rather than a compressor) is then the distillate pump 54 and can discharge the distillate 16 and remove gasses as needed to maintain an ideal pressure by using a vacuum pump 52.

Figure 5:
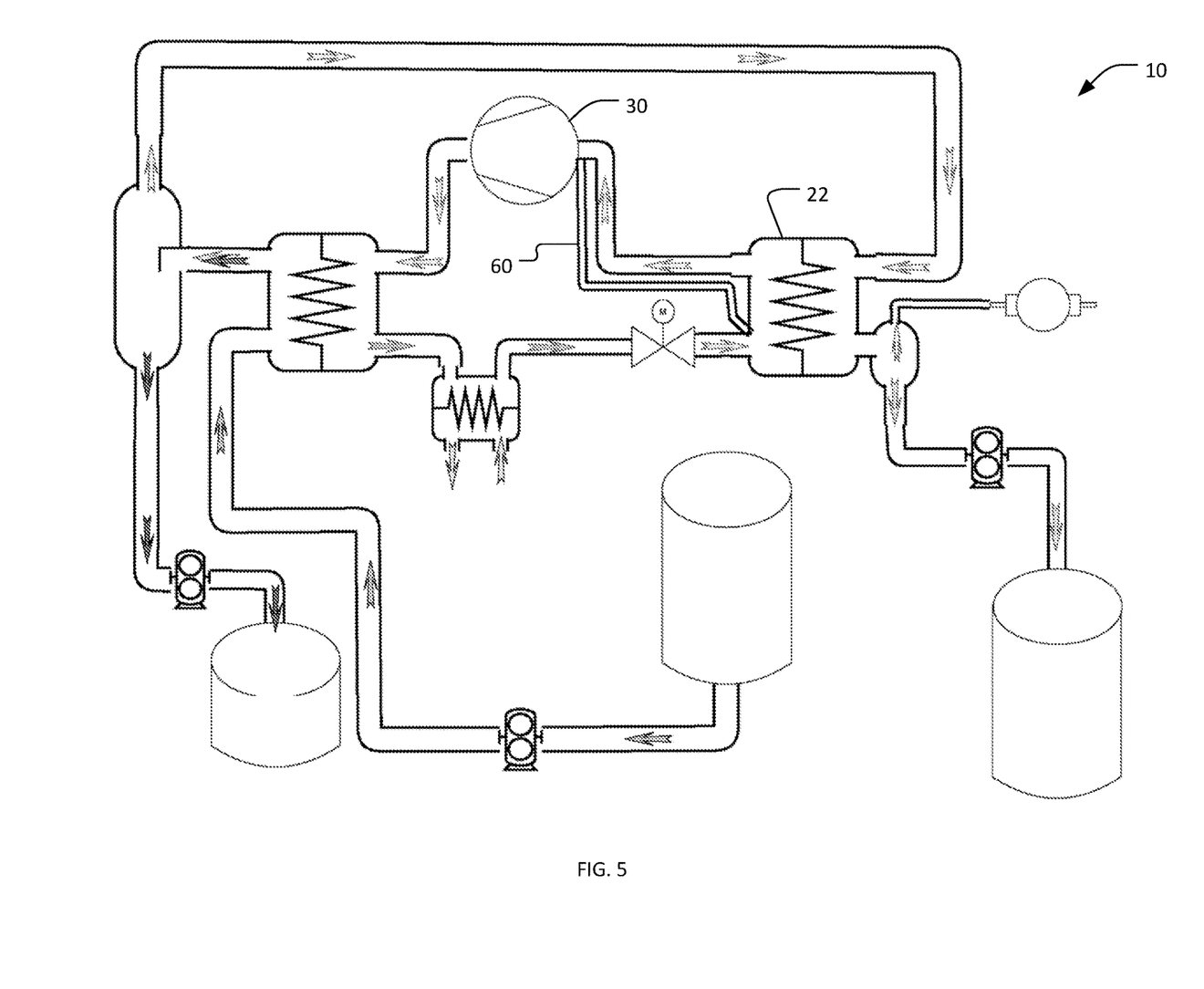
FIG. 5 is a schematic diagram depicting another alternate distillation system in accord with the present invention.

FIG. 5 is a schematic diagram depicting another alternate distillation system 10 in accord with the present invention. The salient difference here is the addition of a bypass line 60 where some of the working fluid 28 is allowed to bypass the second heat exchanger 22 so that lubrication oil for the working fluid compressor 30 that collects and concentrates in the second heat exchanger 22 may make its way back to the working fluid compressor 30.

The bypass line 60 is a practical option because lubrication oil in the working fluid 28 can collect in the second heat exchanger 22 and need to be returned to the working fluid compressor 30. This does not improve the performance of the distillation system 10, but does get oil back to where it needs to be. The oil here is dissolved in the working fluid 28 (liquid refrigerant) so this can reduce preference (but only a little is allowed into the bypass line 60 so the effect is relatively small). In practice the inventors have found that across four recycles in the second heat exchanger 22 most of the loss in cooling power is minimized by the overall loss of performance.

Figure 6:
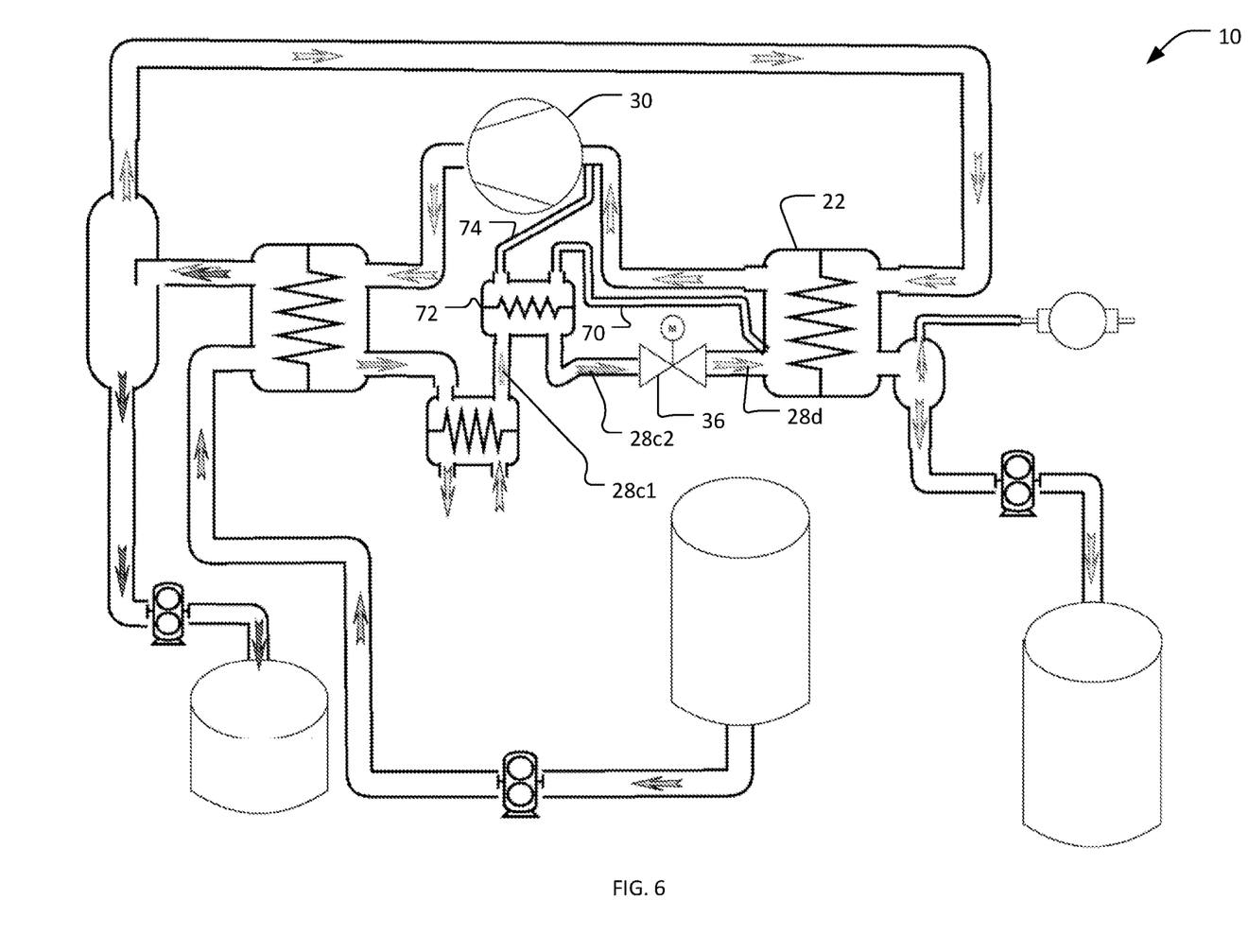
FIG. 6 is a schematic diagram depicting another alternate distillation system in accord with the present invention.

FIG. 6 is a schematic diagram depicting another alternate distillation system 10 in accord with the present invention. This embodiment builds on the principals of the embodiment in FIG. 5. A first bypass line 70, a fourth heat exchanger 72, a second bypass line 74 replace the bypass line 60 in FIG. 5. After the expansion device 36, the working fluid 28 (arrow 28d) enters the second heat exchanger 22. Specifically, it enters the cool side of the second heat exchanger 22 and the low pressure side of the energy recovery side 10b of the distillation system 10. There a portion is drawn off through the first bypass line 70, through the fourth heat exchanger 72 (as discussed presently), and through the second bypass line 74 onward to the working fluid compressor 30.

As discussed previously, heat exchangers have hot and cool sides. The bottom side of the fourth heat exchanger 72 is its hot side. It receives and passes hot working fluid 28 (arrow 28c1) through the fourth heat exchanger 72 where it exits as cooler working fluid 28 (arrow 28c2). The working fluid 28 here is on the high pressure side of the energy recovery side 10b of the distillation system 10. The top side of the fourth heat exchanger 72 is its cool side. It receives and passes cooled working fluid 28 (the portion drawn off as discussed above). This portion of the working fluid 28 is on the low pressure side of the energy recovery side 10b of the distillation system 10.

Figure 7:
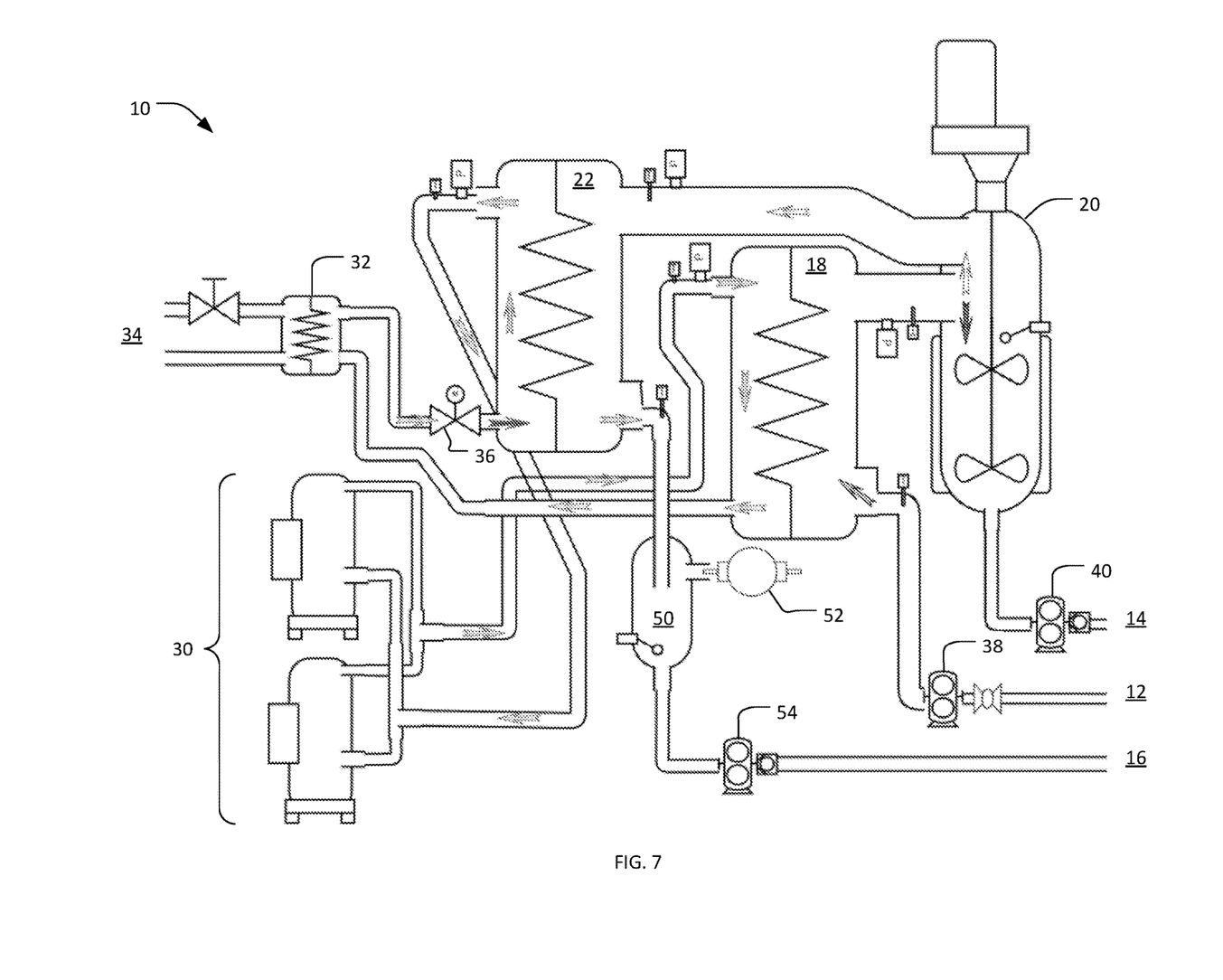
FIG. 7 is a schematic diagram depicting another alternate distillation system in accord with the present invention.
Figure 8:
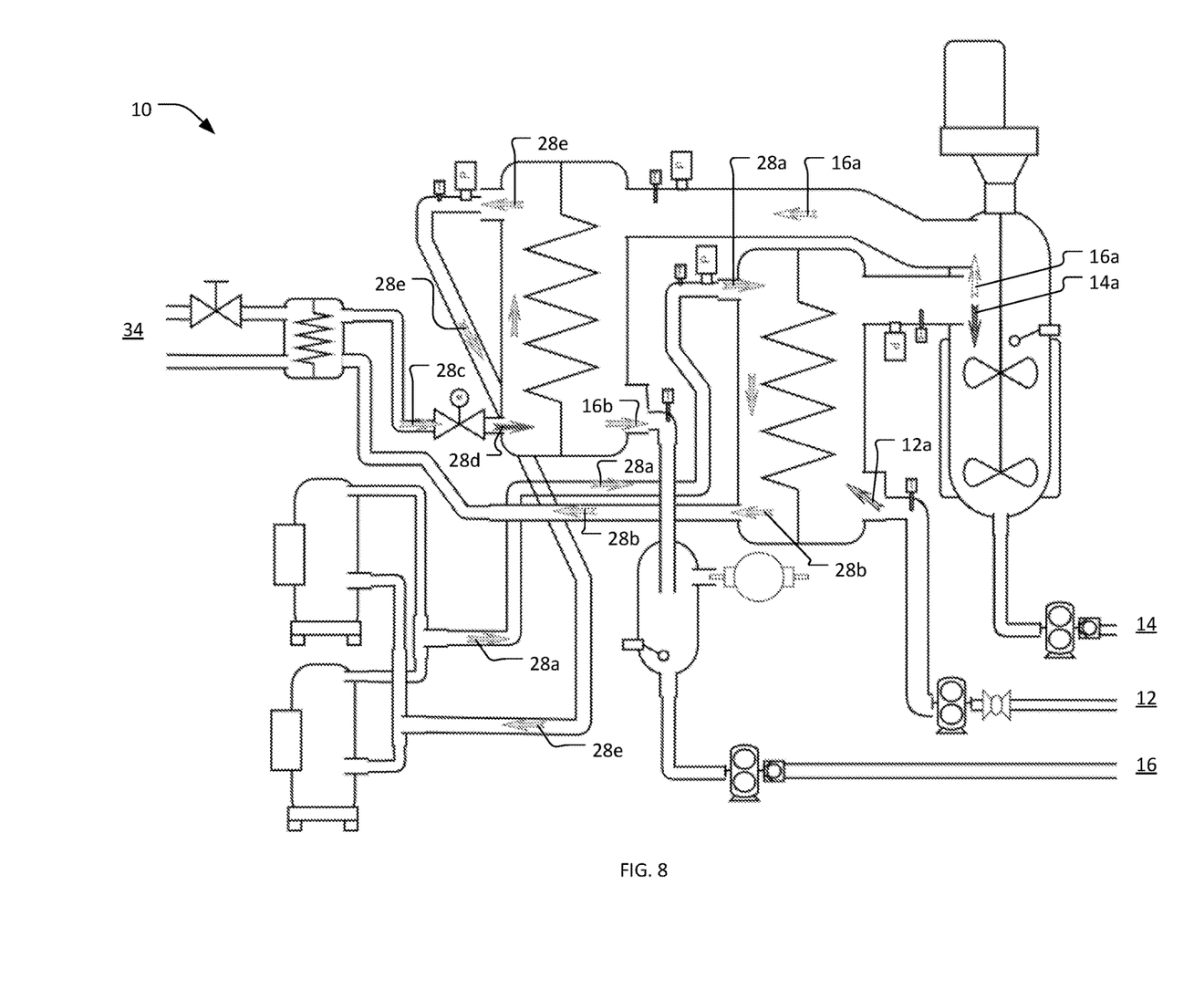
FIG. 8 is a version of FIG. 7 that is simplified by removing apparatus references to facilitate seeing liquid and vapor states depicted as arrows.

FIG. 7 is schematic diagrams depicting another alternate distillation system 10 in accord with the present invention, and FIG. 8 is a version of FIG. 7 that is simplified by removing apparatus references to facilitate seeing liquid and vapor states depicted as arrows. References similar to those used in prior figures are again used here to convey element similarity.

FIG. 7 includes a feed solution 12, a residue 14, a distillate 16, water 34; a first heat exchanger 18, a separator 20, a second heat exchanger 22, a third heat exchanger 32, (a working fluid is not shown but should be understood to be present), working fluid compressors 30 (at least one is needed), an expansion device 36, a feed pump 38, a residue pump 40, a second separator 50 (again a vacuum separator), a vacuum pump 52, and a distillate pump 54. The liquid separator 20 here is a simple "gravity tank" (a large volume where the heavier liquid can just fall to the bottom) but packed columns and vortex separators are well-known and quite suitable alternatives.

For solvent discharge in the embodiment in FIGS. 1-2, a liquid ring pump was employed as the distillate extractor 24. This can serve the purposes of both discharging the distillate 16 and controlling the pressure of the distillation system 10. In practice, however, the inventors prefer to use the separate vacuum pump 52 (to control the pressure) and a liquid distillate pump 54 (e.g., in the manner of the vacuum pump 52 and the distillate pump 54 in FIG. 4).

FIG. 8 includes arrow 12a, depicting feed solution 12; arrow 14a, depicting residue 14; and arrows 16a depicting distillate 16 that has been heated and evaporated into a vapor and arrow 16b depicting distillate 16 that has been cooled and condensed into a liquid. FIG. 8 further includes arrows 28a, depicting working fluid that is hot high pressure refrigerant (post working fluid compressor 30 and pre first heat exchanger 18); arrows 28b, depicting working fluid that is warm high pressure refrigerant (post first heat exchanger 18 and pre third heat exchanger 32); arrow 28c, depicting working fluid that is cool high pressure refrigerant (post third heat exchanger 32 and pre expansion device 36); arrow 28d, depicting working fluid that is cool low pressure refrigerant (post expansion device 36 and pre second heat exchanger 22); and arrows 28e, depicting working fluid that is warm low pressure refrigerant (post second heat exchanger 22 and pre working fluid compressor 30).

Figure 9:
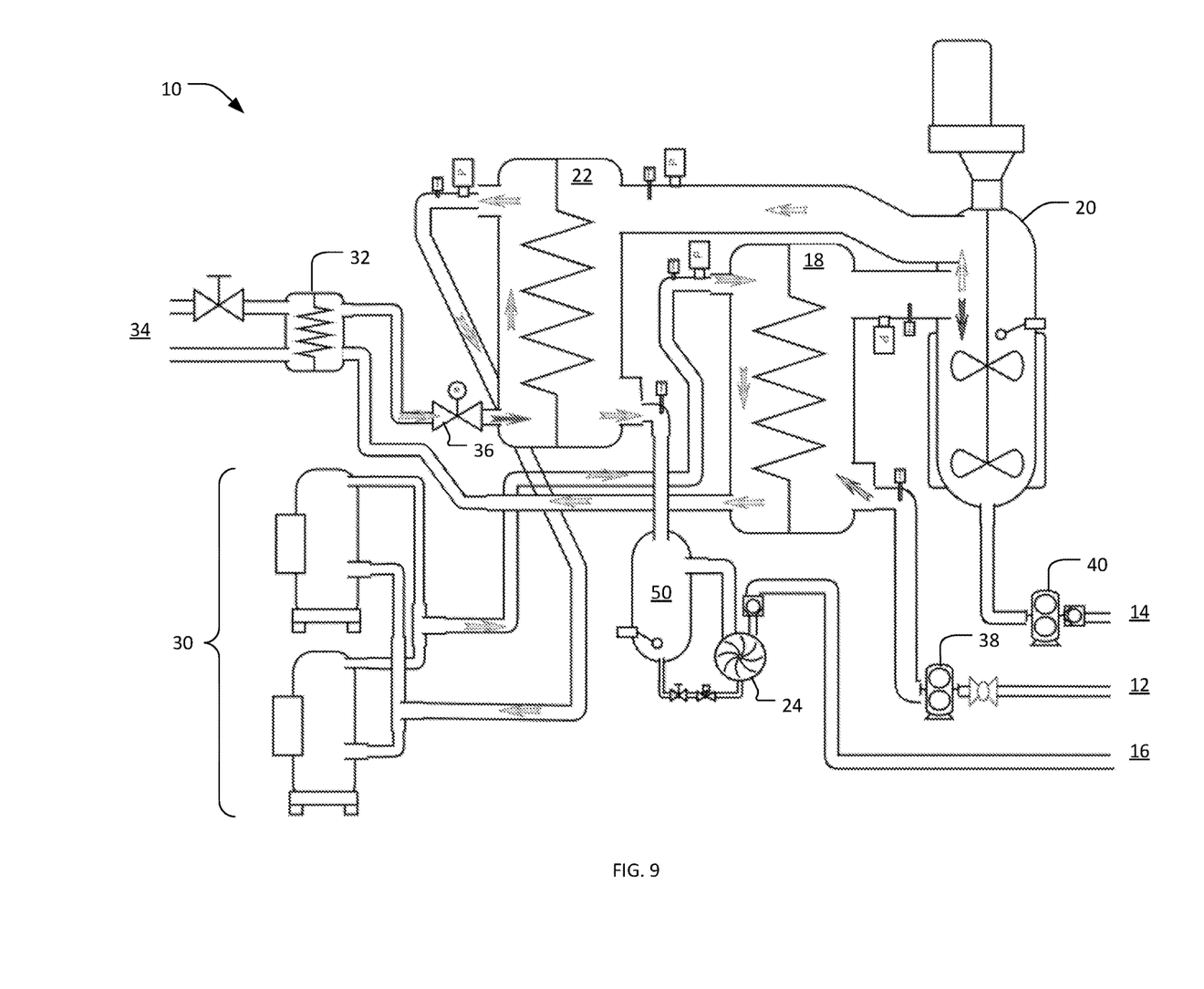
FIG. 9 is a schematic diagram depicting another alternate distillation system in accord with the present invention.
Figure 10:
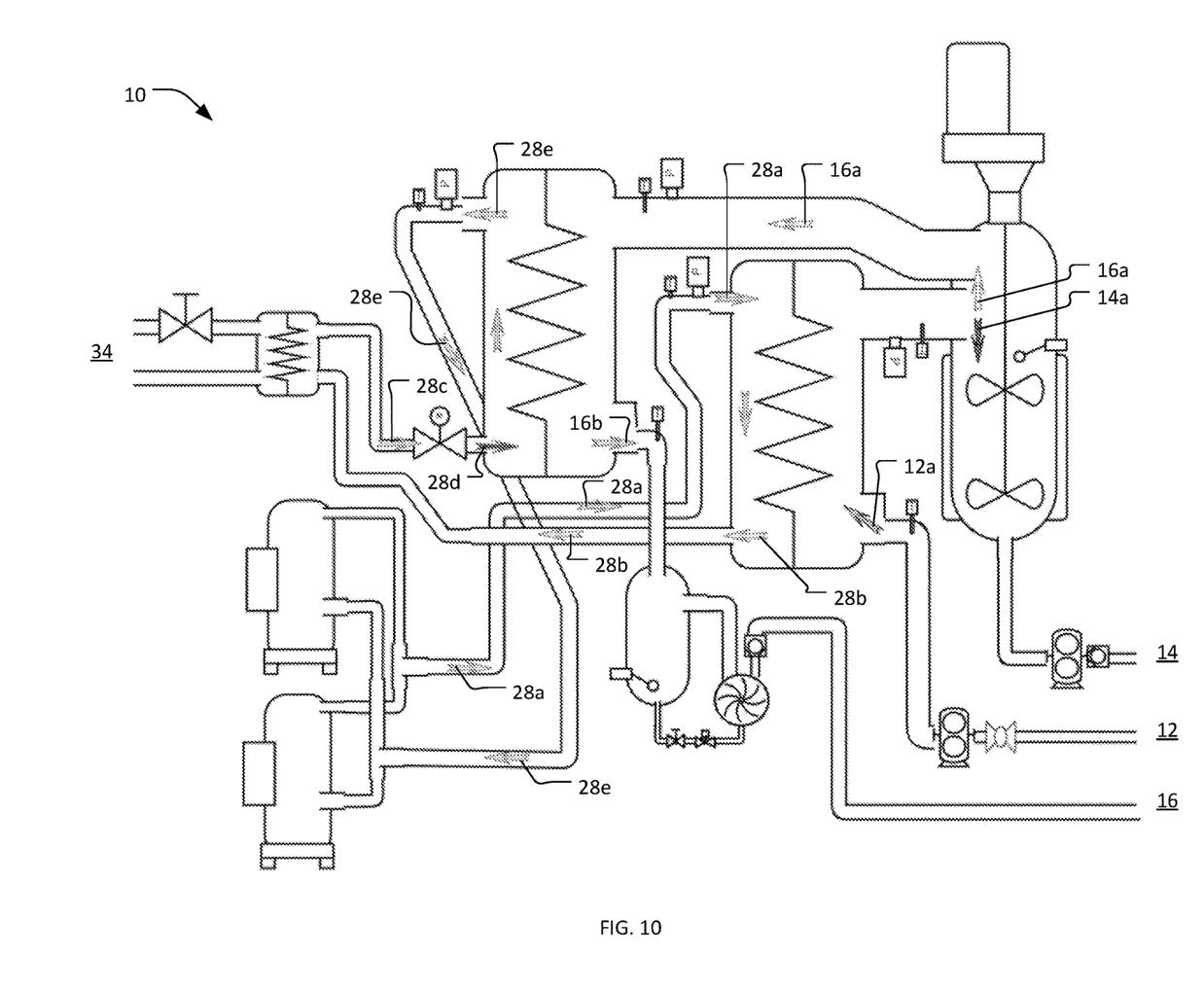
FIG. 10 is a version of FIG. 9 that is simplified by removing apparatus references to facilitate seeing liquid and vapor states depicted as arrows.

FIG. 9 is schematic diagrams depicting another alternate distillation system 10 in accord with the present invention, and FIG. 10 is a version of FIG. 9 that is simplified by removing apparatus references to facilitate seeing liquid and vapor states depicted as arrows. References similar to those used in prior figures are again used here to convey element similarity.

FIG. 9 includes a feed solution 12, a residue 14, a distillate 16, water 34; a first heat exchanger 18, a separator 20, a second heat exchanger 22, a third heat exchanger 32, (again a working fluid is not shown but should be understood to be present), working fluid compressors 30 (again, at least one is needed), an expansion device 36, a feed pump 38, a residue pump 40, a second separator 50, and a distillate extractor 24. The liquid separator 20 here is again a simple gravity tank.

FIG. 10 includes the same arrows as appear in FIG. 8 only here with respect to the apparatus in FIG. 9.

Figure 11:
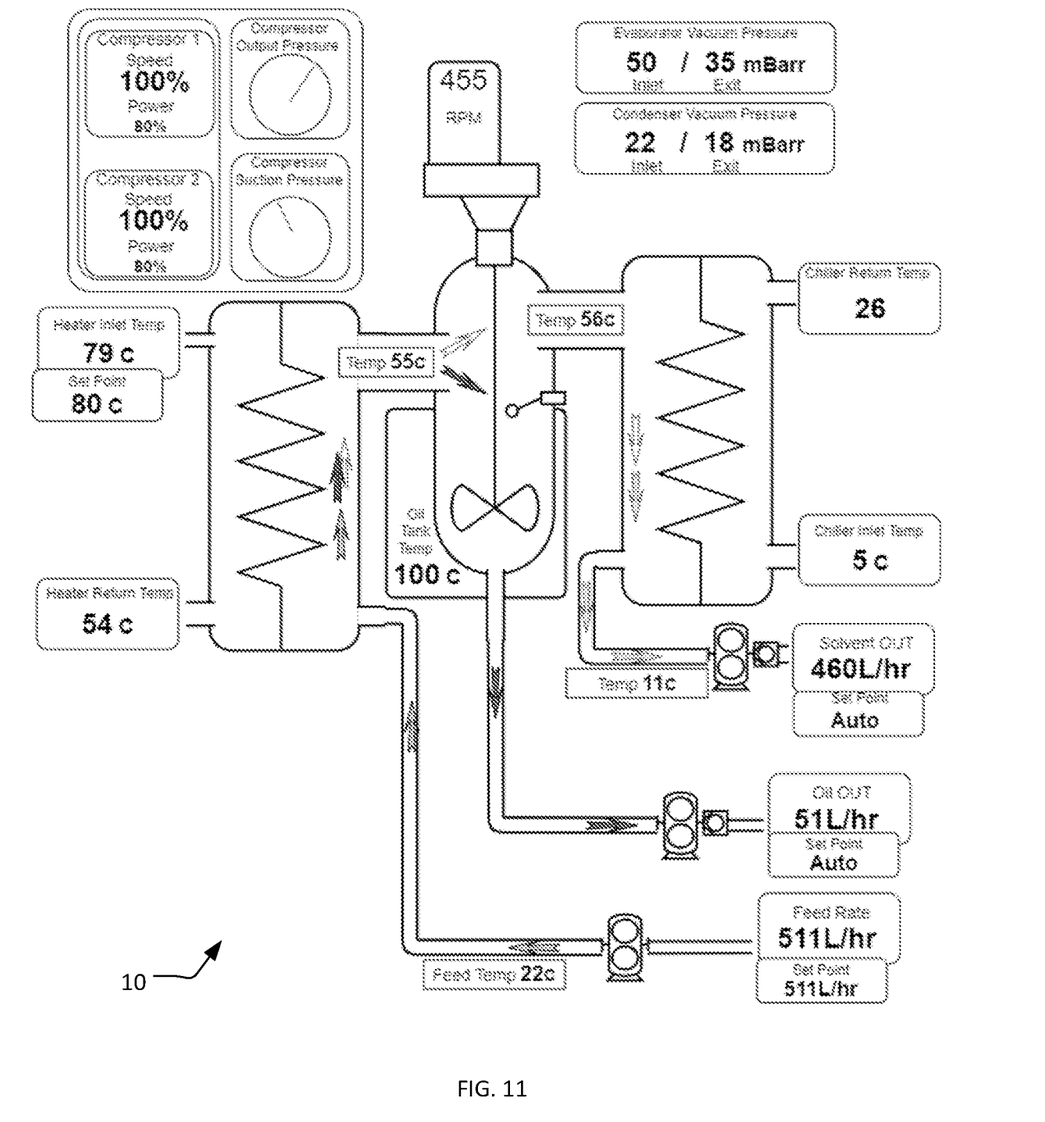
FIG. 11 is a block diagram depicting typical process aspects of the inventive heat pump driven distillation system in FIGS. 7-10.

FIG. 11 is a block diagram depicting typical process aspects of the inventive heat pump driven distillation system 10 in FIGS. 7-10.

Figure 12:
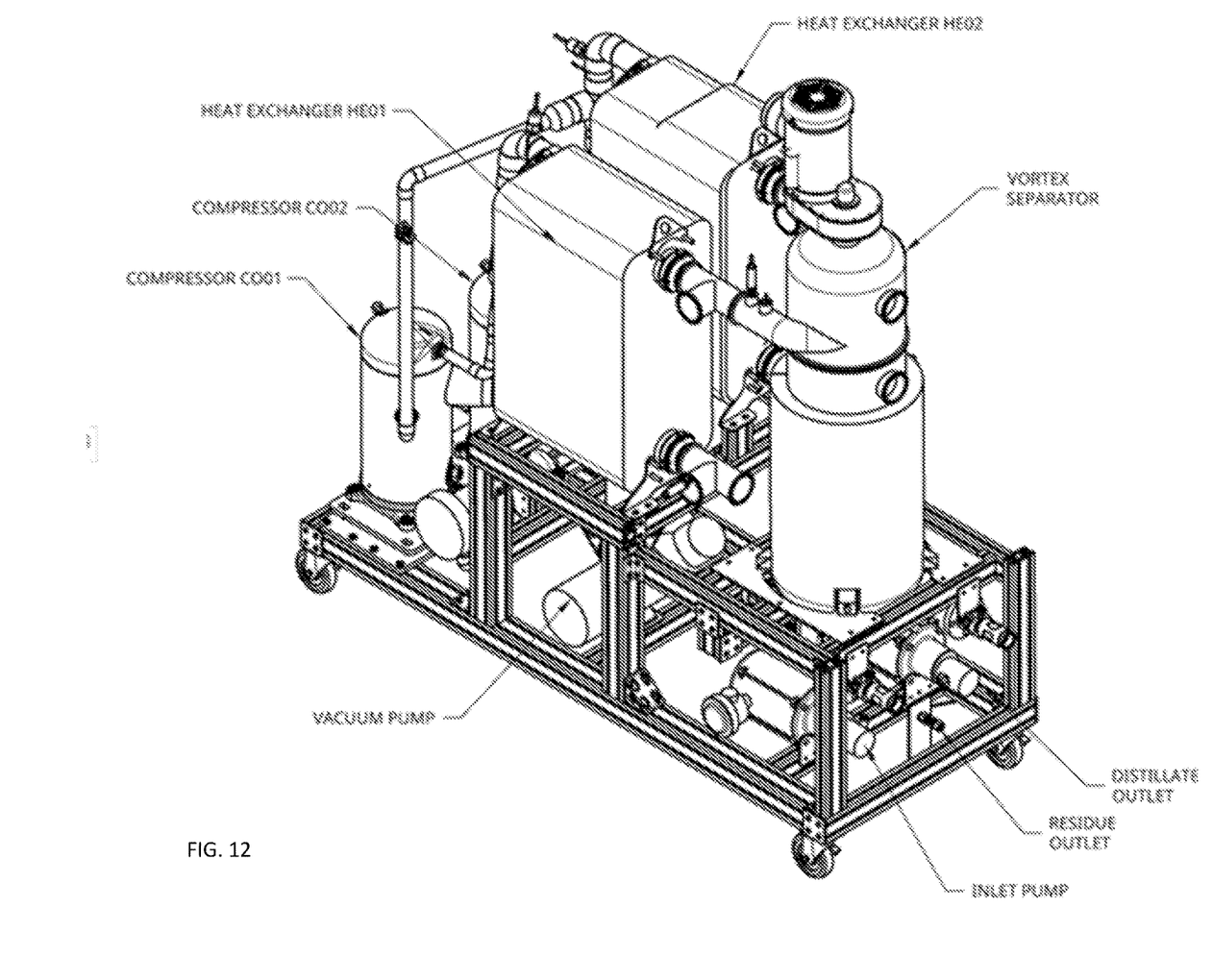
FIG. 12 is a front oblique assembly view of another embodiment of the distillation system.
Figure 13:
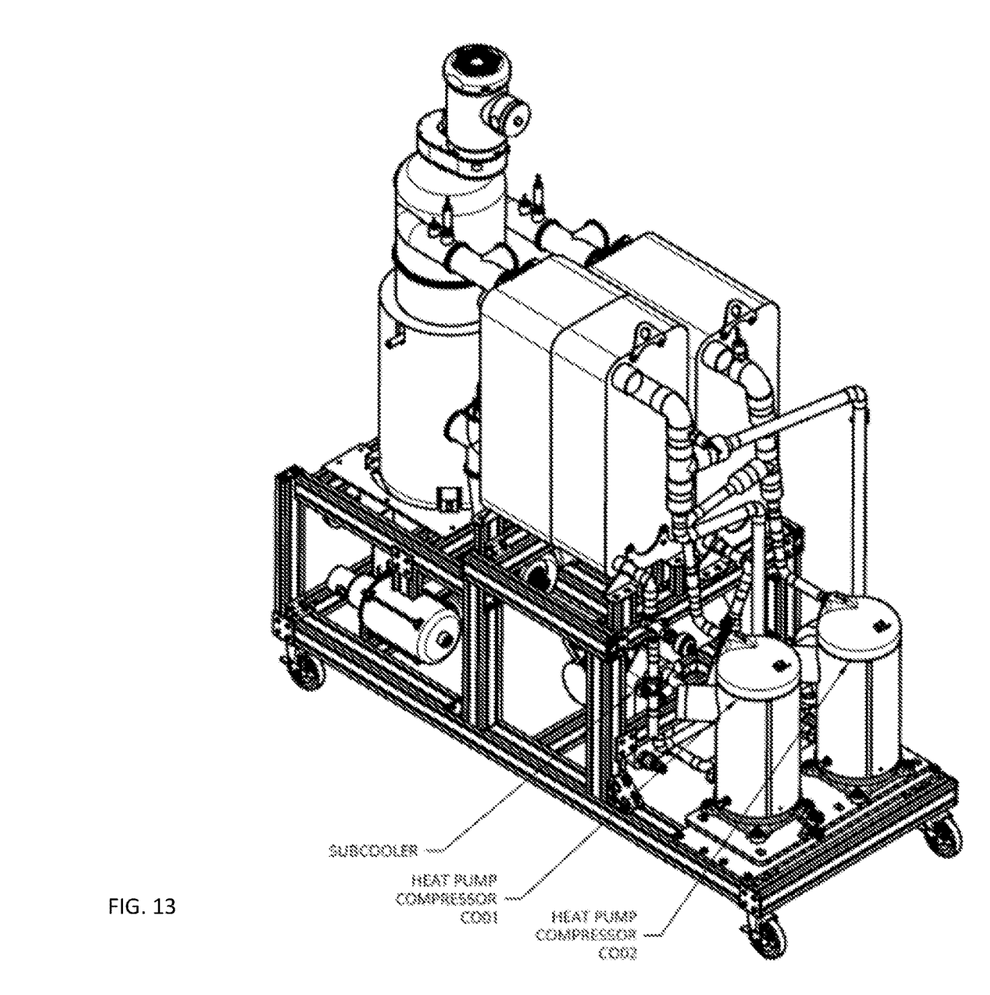
FIG. 13 is a back oblique assembly view of the same embodiment in FIG. 12.

FIG. 12 is a front oblique assembly view of another embodiment of the distillation system 10 and FIG. 13 is a back oblique assembly view of the same embodiment in FIG. 12. Here the use of a standard refrigeration cycle system and vacuum pump (VP-01) can be utilized as a heat pump and pressure control for the purpose of distilling and purification of a solution through plate heat exchangers and a vortex separator (referred to as VX-01). A feed solution can be pumped into a first heat exchanger (referred to as HE-01). HE-01 is heated by the high pressure vapor from the discharge of the refrigeration system compressors. The heat is transferred through the plate heat exchanger to the feed solution until a desired temperature is reached. At this temperature the liquid molecule is vaporized and travels up the plate exchanger's channels and into VX-01. Inside VX-01 any undesired vaporized molecules will be separated and removed by a separate pump while the targeted molecules are forced through separate exit opening. After exiting the VX-01 the purified molecules travel through a second heat exchanger (HE-02). Input to HE-02 is the gaseous molecules from the feed solution and from the refrigerant side is the subcooled/saturated liquid. The liquid refrigerant provides the cooling needed to condense the targeted molecule from the solution and pump it out of the system.

While various embodiments have been described above, it should be understood that they have been presented by way of example only, and that the breadth and scope of the invention should not be limited by any of the above described exemplary embodiments but should instead be defined only in accordance with the following claims and their equivalents.

What is claimed is:

1. A distillation system (10) having a process side (10a) and an energy recovery side (10b) wherein the process side (10a) receives a feed solution (12) including a solute to produce therefrom a residue (14) and a distillate (16), the distillation system consisting of:
    a heat pump (42) in the energy recovery side of the distillation system;
    a first heat exchanger (18) having a first exchanger process side (18a) in the process side, and a first exchanger recovery side (18b) in the energy recovery side and wherein the heat pump comprises the first exchanger recovery side;
    a second heat exchanger (22) having a second exchanger process side (22b) in the process side, and a second exchanger recovery side (22a) in the energy recovery side and wherein the heat pump comprises the second exchanger recovery side;
    said heat pump further including a working fluid (28), a working fluid compressor (30), and an expansion device (36);
    said heat pump to pass said working fluid through said second exchanger recovery side, through said working fluid compressor, through said first exchanger recovery side, through said expansion device, and back into said second exchanger recovery side such that said working fluid receives available heat energy from the distillate while in said second heat exchanger, receives at least some additional said heat energy while in said working fluid compressor, and releases at least some said heat energy into the feed solution in said first heat exchanger;
    said first exchanger process side to receive the feed solution, thereby permitting transfer of at least some said heat energy into the feed solution;
    a separator (20) to receive the feed solution from said first heat exchanger and separate the feed solution into the residue and the distillate;
    said second exchanger process side to receive the distillate, thereby permitting transfer of at least some said heat energy back into said working fluid; and
    a distillate extractor (24) to direct the distillate out of said second heat exchanger.

2. The distillation system of claim 1, wherein at least one of said first heat exchanger and said second heat exchanger is a parallel plate type heat exchanger.

3. The distillation system of claim 2, wherein the feed solution flows upward and said working fluid flows downward in said first heat exchanger.

4. The distillation system of claim 2, wherein the distillate flows downward and said working fluid flows upward in said second heat exchanger.

5. The distillation system of claim 1, wherein said working fluid compressor is a scroll type compressor.

6. The distillation system of claim 1, wherein said working fluid compressor includes a plurality of compressor units.

7. The distillation system of claim 1, wherein said expansion device is an expansion type valve.

8. The distillation system of claim 1, wherein said expansion device includes a capillary.

9. The distillation system of claim 1, wherein said separator is a vortex type separator.

10. The distillation system of claim 1, wherein said separator is a packed column type separator.

11. The distillation system of claim 1, wherein said heat pump further consists of a third heat exchanger (32) to remove excess said heat energy from said working fluid.

12. The distillation system of claim 11, wherein said third heat exchanger employs water cooling.

13. The distillation system of claim 1, wherein said distillate extractor is a liquid ring type compressor.

14. The distillation system of claim 1, wherein said distillate extractor includes a second separator (50) and a vacuum pump (52).

15. The distillation system of claim 1, further consists of a bypass line (60) to direct a portion of said working fluid containing lubrication oil for said working fluid compressor past said second heat exchanger.

16. The distillation system of claim 15, wherein said bypass line includes a fourth heat exchanger (70).

17. The distillation system of claim 1, further comprising at least one of a feed pump (38) to direct the feed solution into said first heat exchanger, and a residue pump (40) to direct the residue out of said separator.

18. The distillation system of claim 17, wherein said feed pump is a rotary compressor type pump and any said residue pump is a rotary compressor type pump.

* * * * *